United States Patent [19]

Becker

[11] 4,435,112
[45] Mar. 6, 1984

[54] FASTENER ASSEMBLY

[75] Inventor: Philip D. Becker, Southbury, Conn.

[73] Assignee: Buell Industries, Inc., Waterbury, Conn.

[21] Appl. No.: 252,385

[22] Filed: Apr. 9, 1981

[51] Int. Cl.³ ............................................. F16B 43/00
[52] U.S. Cl. ................................. 411/368; 10/155 R; 10/155 A; 29/453; 29/526 R; 411/531; 411/546
[58] Field of Search ............... 411/154, 155, 156, 368, 411/371, 372, 521, 531, 532, 533, 539, 540, 541, 544, 546, 547; 10/155 R, 155 A; 29/453, 526 R

[56] References Cited

U.S. PATENT DOCUMENTS

| | | | |
|---|---|---|---|
| 1,356,404 | 10/1920 | Robinson | 411/546 |
| 1,497,859 | 6/1924 | Lilly | 411/533 |
| 2,283,494 | 5/1942 | Erdman | 10/155 A X |
| 2,476,074 | 7/1949 | Unger | 411/368 X |
| 3,016,941 | 1/1962 | Coldren | 411/155 X |
| 3,160,054 | 12/1964 | Cohen et al. | 411/371 |
| 3,168,321 | 2/1965 | Glicksman | 411/531 X |
| 3,687,184 | 8/1972 | Wagner | 411/544 X |
| 4,193,434 | 3/1980 | Wagner | 411/54 |
| 4,238,165 | 12/1980 | Wagner | 411/378 X |

FOREIGN PATENT DOCUMENTS

| | | | |
|---|---|---|---|
| 110083 | 3/1940 | Australia | 411/531 |
| 1160971 | 3/1958 | France | 411/155 |
| 6605730 | 11/1966 | Netherlands | 411/531 |
| 793832 | 4/1958 | United Kingdom | 411/532 |

Primary Examiner—Thomas J. Holko

Attorney, Agent, or Firm—St. Onge, Steward, Johnston & Reens

[57] ABSTRACT

An improved fastener assembly is designed for securing a workpiece, having known thickness and a hole therethrough and being subject to plastic deformation, to a support. The fastener assembly can apply a high clamping load to the workpiece yet causes minimal cold plastic deformation of it and includes a fastener having a head and a shank projecting from the head. The shank includes an upper portion adjacent the head, an annular rib that protrudes radially outwardly from the upper portion at its extreme opposite the head, and an operative portion engageable in the support. A washer having a hole therein is received about the upper portion of the shank and is formed on one of its faces with an annular rabbet encircling the hole. A sleeve includes a generally cylindrical side wall having an axially extending split discontinuity and circular edges at its opposing axial extremes. The sleeve also includes a constriction at one of the circular edges, having a reduced diametrical dimension, that is confinable between the rib and the bearing surface of the head of the fastener. In the normal condition of the sleeve with its cylindrical side wall collapsed at the discontinuity, the one edge of the side wall is received in the annular rabbet of the washer to confine the side wall from spreading at the discontinuity. When the fastener device is engaged in the support the sleeve bears the major portion of the clamping load while the washer holds the workpiece in place against the support.

28 Claims, 6 Drawing Figures

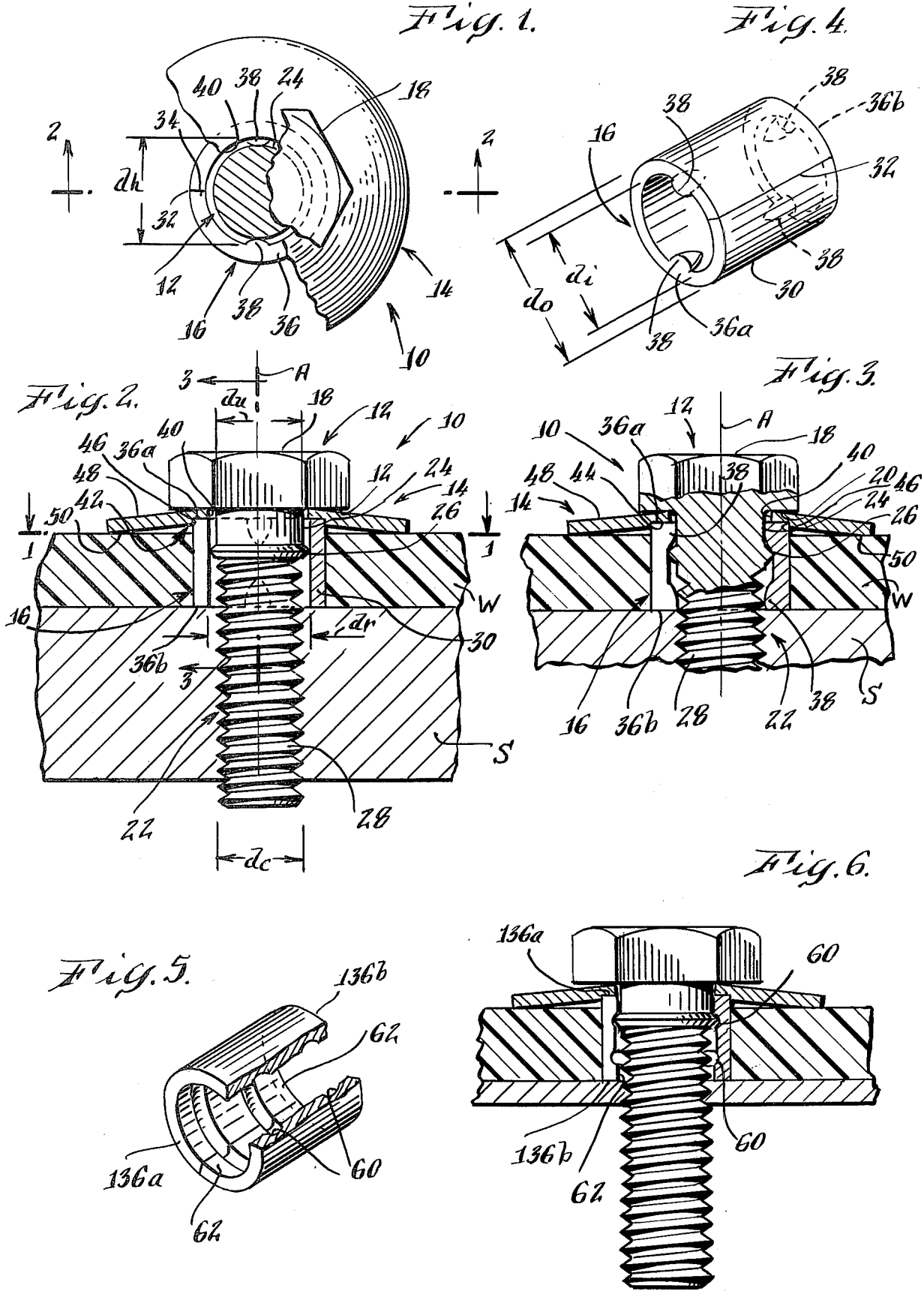

FASTENER ASSEMBLY

BACKGROUND OF THE INVENTION

1. Field of the Invention

The present invention relates to an improved fastener assembly for securing a workpiece to a support. More particularly, the present invention relates to a fastener, washer, and stand-off sleeve assembly for fastening a workpiece, which is subject to plastic deformation, to a support such that the workpiece is reliably held in place over an extended period of time.

Materials such as thermoplastic and thermosetting plastics have come into widespread use. Such materials may be relatively easily formed into complex shapes. They are highly corrosion resistant and often cost less than other materials such as metals like aluminum or steel. However, most common plastic materials are more subject to plastic deformation or cold flow than are metals such as aluminum and steel. Further, cold plastic deformation, creep, or flow of a plastic material often occurs when it is fastened to a support by a conventional fastener. That is, the plastic material deforms or creeps out from between the fastening surfaces of the fastener and support. Therefore, the joint initially formed by the fastener loosens in time since the thickness originally confined between the fastening surfaces of the fastener and the support lessens. Accordingly, it is desireable for a fastener to apply a fixed load to the plastic workpiece which is less than will cause plastic deformation of it yet which is sufficient to hold the plastic workpiece securely in position. It is also desirable that the fastener maintain its tightly secured condition against the base or support structure to which the workpiece is attached.

2. Description of the Prior Art

Various attempts to solve the problems in securing plastic or plastic-like materials to a support structure have been proposed in the past. For example, U.S. Pat. Nos. 4,193,434 (Wagner) and 4,238,165 (Wagner) both disclose preassembled fastener units for clamping plastic workpieces to support structures. These fastener units comprise a preassembled bolt and washer-like device. The washer-like device includes a tubular sleeve having a radially inwardly directed protruberance in the upper region of its inner wall. The upper extremity of the shank of the bolt is unthreaded and includes a mating radially outwardly projecting protuberance that cooperates with the protuberance on the sleeve so that the washer-like structure may be snapped onto the shank of the bolt and be axially retained and free spinning thereon.

The washer-like device further includes a radially extending spring flange at its upper extremity that is conical and has its outermost periphery spaced upwardly from the lowermost extremity of the sleeve by a distance substantially equal to the thickness of the plastic workpiece.

The outside diameter of the sleeve is approximately equal to the inside diameter of a hole through the workpiece at the location where the workpiece is to be fastened to the support. Accordingly, when the bolt is taped into the support with the sleeve received in the hole in the workpiece the major clamping load between the head of the bolt and the support is borne by the sleeve. That is, the sleeve acts as a column or load bearing strut. The workpiece is held in place by the radial flange of the washer-like device. The spring characteristics of this flange may be varied to reduce or increase the spring load on the plastic workpiece as the major clamping load is borne by the sleeve.

While both Wagner patents disclose similar fastener devices, the '165 Wagner patent further specifies that the sleeve have an inside diameter substantially equal to the outside diameter of the crest of threads on the threaded portion of the shank of the bolt plus twice the thickness of the support which is assumed to be sheet metal. This dimensional relationship is alleged to increase the stripping torque, that is, the torque to which the fastener may be tightened without stripping the sheet metal support to which the workpiece is attached.

It has been found that certain practical drawbacks characterize the fastener devices disclosed in both Wagner patents. The washer-like device described and illustrated in both patents as a unitary structure is both relatively difficult and expensive to make. It typically may be drawn from a single piece of sheet metal and, therefore, requires relatively large amounts of material to make. Further, if it is attached or snapped onto the bolt before heat treatment, it is likely to be plasticly deformed during assembly. Therefore, little or no spring back of the metal to its original form will occur. When assembled with the bolt, the inside diameter of the protuberance on the sleeve may be stretched to be large enough relative to the diameter of the protuberance on the shank of the bolt so that the whole washer-like structure can fall off of the bolt. Conversely, if the components are assembled after heat treatment of the washer-like device, the spring back of the washer-like device may not be sufficient to hold the washer on the bolt. Again, therefore, the two parts of the preassembled unit may become disassembled.

It has also been found that, despite the claims of the '165 Wagner patent, the space specified between the interior of the sleeve and the crests of threads on the threaded portion of the shank of the bolt is excessive and causes torque at which the bolt strips the support to decrease not increase. Therefore, poor connection of the workpiece to the support results.

SUMMARY OF THE INVENTION

It is an object of the present invention to provide an improved fastener assembly of the general type disclosed in U.S. Pat. Nos. 4,193,434 (Wagner) and 4,238,165 (Wagner) that nevertheless represents a substantial improvement over both Wagner devices.

More particularly, it is an object of the present invention to provide an improved fastener assembly that can be produced with substantially less material than can the fasteners disclosed in the prior art.

It is a further object of the present invention to provide such an improved fastener assembly that after assembly reliably resists inadvertent disassembly.

It is still another object of the present invention to provide an improved fastener assembly that can be made at less cost because it requires less material and has a much lower rate of failure due to inadvertent disassembly than do fasteners of this general type known in the prior art.

It is still a further object of the present invention to provide an improved fastener assembly that can generate high clamping loads to attach a workpiece to a support without stripping the support.

In general accordance with the present invention, the improved fastener assembly is adapted to secure a workpiece to a support. The workpiece has a known thickness and a hole therethrough and is assumed to be subject to plastic deformation.

The fastener assembly in accordance with the invention includes a fastener that has a head formed with a load bearing surface and a shank projecting from the head generally perpendicularly from the surface. The shank has an upper portion adjacent the head, a radially outwardly protruding annular rib spaced from the surface, and an operative portion projecting coaxially from the upper portion beyond the rib. The rib has a larger diameter than the diameter of the operative portion of the shank.

The fastener assembly further includes a sleeve formed with a generally cylindrical side wall having an axially extending split discontinuity. The sleeve also has circular edges at opposing axial extremes. With the side wall normally collapsed at the discontinuity, the sleeve has a normal inside diameter larger than the diameter of the rib and a normal outside diameter smaller than the diameter of the hole in the workpiece.

The sleeve further is formed with a radially inwardly projecting constriction adjacent at least one of the circular edges that has a normal diametrical dimension, with the side wall normally collapsed at the discontinuity, less than the diameter of the rib. The diametrical dimension of the constriction is enlargeable from the normal dimension to be greater than the diameter of the rib by spreading the side wall at the discontinuity, in order to position the constriction between the load bearing surface of the fastener and the rib.

The fastener assembly further includes a washer having a hole therein receivable about the upper portion of the shank. The hole has a diameter larger than the diameter of the rib and less than the normal outside diameter of the sleeve. The washer is further formed on one of its faces with an annular rabbet about the washer hole. The rabbet has a base and a radially inwardly directed cylindrical side wall with a diameter greater than the normal outside diameter of the sleeve. Accordingly, the rabbet can receive the one edge of the sleeve adjacent which the constriction is formed, to confine the side wall of the sleeve against spreading. The washer and sleeve are assembled together by having this one edge received in the rabbet.

When the washer and sleeve are assembled, the axial distance between the one face of the washer and the edge of the sleeve remote from the one edge, is only slightly less than the thickness of the workpiece. Additionally, when the washer and sleeve are assembled the axial distance between the face of the washer opposite the one face and the constriction is less than the axial distance between the load bearing surface and the rib of the fastener. Therefore, because of this last mentioned dimensional relationship and the relationships of the diameters of the various components mentioned above, the washer and sleeve are free spinning on the fastener.

When the operative portion of the shank of the fastener is tightened down in a support with the sleeve received in the hole in a workpiece, the sleeve bears the major clamping loads applied by the fastener. That is, the sleeve acts as a column between the load bearing surface of the fastener and the support. However, because the axial distance between the one face of the washer and the extreme circular edge of the sleeve is less than the thickness of the workpiece, the workpiece is tightly clamped to the support without the major clamping load being borne by the workpiece. Therefore, plastic deformation of the workpiece that would tend to cause the workpiece to flow out from under the washer and thus loosen the connection between the fastener, the workpiece and the support, is minimized.

The design of the washer and sleeve of the improved fastener assembly as a two-piece construction minimizes the material required for their manufacture. Further, the material required to manufacture these components as separate pieces is substantially less than would be required if these pieces were manufactured as a unitary or integrated structure by, for example, a drawing process. Therefore, substantial saving in material costs may be realized with the assembly of the invention.

The sleeve may be heat treated prior to assembly to rigidly hold its cylindrical configuration. Accordingly, when assembled after heat treatment with the washer and fastener by spreading it at the axial discontinuity, the sleeve will tightly return to its normal condition collapsed about the discontinuity. Alternatively, prior to heat treatment the sleeve may be rolled from strip stock to its cylindrical configuration directly into place about the shank. Thereafter, the sleeve can be heat treated.

Thus, the sleeve and washer assembly may reliably be assembled with the fastener because the sleeve achieves its normal condition with the constriction confined between the rib and bearing surface of the fastener.

While it is recognized that a column having an axial discontinuity tends to support an axial load more poorly than a column having a homogenious or continuous side wall because failure by spreading at the discontinuity is possible, this ordinarily experienced weakness is avoided by the rabbeted formation on the washer into which one edge of the sleeve is received when the two components are assembled together on the fastener. More particularly, after assembly the rabbet in the washer confines the sleeve against spreading at the axial discontinuity when the fastener is tightened down.

Because assembly of the components is reliably achieved with minimal chance of inadvertent disassembly, undesirable costs due to rejection of parts are also minimized.

Therefore, the improved fastener assembly of the present invention represents a substantial improvement over prior art devices and particularly over those disclosed in the Wagner patents because it can be made at substantially less cost and because it minimizes rejections due to inadvertent disassembly of its components. Furthermore, as will be pointed out in greater detail below, specific details of construction of the fastener assembly of the present invention enable it to be tightened to higher torques than were previously achieved with prior art designs before the support to which a workpiece is attached is stripped.

Other objects, aspects, and features of the present invention in addition to those mentioned above will be pointed out in or will be understood from the following detailed description provided in conjunction with the accompanying drawings.

BRIEF DESCRIPTION OF THE DRAWINGS

FIG. 1 is a top plan view of a first embodiment of the fastener assembly of the present invention, partly broken away and partly shown in horizontal cross-section taken on plane 1—1 in FIG. 2 to illustrate details.

FIG. 2 is a vertical cross-sectional view of this fastener assembly taken on plane 2—2 in FIG. 1.

FIG. 3 is a partial vertical cross-sectional view of this fast assembly taken on plane 3—3 in FIG. 2.

FIG. 4 is a perspective view of the sleeve used in this first embodiment of the fastener assembly of the invention.

FIG. 5 is a perspective view, partly broken away to show detail of a sleeve used in a second embodiment of the invention.

FIG. 6 is a vertical cross-sectional view, similar to that of FIG. 2, of the second embodiment of the invention.

DETAILED DESCRIPTION OF THE PREFERRED EMBODIMENTS

As shown in FIGS. 1, 2 and 3, the fastener assembly of the first embodiment of the present invention, generally indicated at 10, includes a fastener, generally indicated at 12, a washer generally indicated at 14, and a cylindrical sleeve, generally indicated at 16. In this first embodiment, the fastener 12 includes a head 18 configured to be engaged by a tool for applying a torque about the fastener axis. For example, the head may be slotted to receive a flat or phillips head screw-driver or may be formed as shown with a hexagonal shape in plan view to provide wrench flats for receiving a wrench. At its base, the head 18 is formed with a load bearing surface 20 that extends generally perpendicularly from the axis A of the fastener.

The fastener is further formed with a shank, generally indicated at 22, that extends perpendicularly from the bearing surface 20 and includes a cylindrical, unthreaded portion 24 adjacent the surface 20, a radially outwardly protruding annular rib 26 formed at an extreme of the unthreaded portion 24, and a threaded portion 28 that extends coaxially with the unthreaded portion 24. The threaded portion 28 of the shank is adapted to be tapped into or otherwise engaged with a support S to which a workpiece W is to be attached.

The fastener 12 of the preferred embodiments of the invention are described and illustrated as being threaded. Any thread formation such as a thread cutting, spaced thread or machine thread formations may be provided on the threaded portion of the fastener. Additionally, the fastener may be equipped with means other than threads for engaging the support S. For example, the fastener may be a rivet-like fastener. The formation of the unthreaded portion of the shank of the fastener and of the annular rib are however, important features of the fastener used in the invention regardless of the nature of operative portion of the fastener. In the preferred embodiments this operative portion is, of course, the threaded portion of the shank.

As can be seen in FIG. 2, the outside diameter $d_c$ of the crest of the threads on the threaded shank portion 28 is less than the outside diameter $d_r$ of the rib 26. Further, the outside diameter $d_u$ of the unthreaded portion 24 of the shank is also less than the outside diameter $d_r$ of the rib.

The sleeve 16 of the fastener assembly of the invention includes a generally cylindrical side wall 30 that has an axially extending split discontinuity 32 therein. Therefore, the sleeve need not be made with relatively complicated processes like stamping or drawing but instead may be made by rolling strip stock of a suitable material such as steel prior to heat treatment. In its normal condition, the cylindrical side wall is collapsed at the axial split discontinuity 32 so that the axially extending edges 34 of the side wall 30 that define the discontinuity are in confronting relation and preferably in contact with each other.

Accordingly, the cylindrical side wall of the sleeve defines a column capable of bearing an axial load.

When the sleeve is roll-formed as described above, the cylindrical side wall 30 further defines opposed circular edges 36 each of which defines a plane extending perpendicularly to the axis of the side wall. At each of the opposed edges 36, the cylindrical side wall 30 is punched or staked to form two inwardly projecting detents 38 which together define a constriction having a normal diametrical dimension, when the cylindrical side wall in its normal collapsed condition, less than the outside diameter $d_r$ of the rib 26 but greater than the outside diameter $d_u$ of the unthreaded shank portion. Since detents 38 are staked at both opposing circular edges 36 of the sleeve, the sleeve and fastener may be assembled, as will be described in greater detail below, without regard to upward or downward orientation of either edge 36. Further, the normal inside diameter $d_i$ of the sleeve is greater than the diameter $d_r$ of the rib 26.

The washer 14 of the preferred embodiments of the invention is a rigid annular ring having a slightly conical shape. The washer is formed with a central hole 40 having an inside diameter $d_n$ greater than the outside diameter $d_r$ of the rib 26 and less than the outside diameter $d_o$ of the sleeve. An annular downwardly facing rabbet 42 is formed about the washer hole 40 and includes a base 44 extending perpendicularly to the axis of the washer and a radially inwardly facing cylindrical side wall 46.

The inside diameter of the cylindrical side wall 46 of the rabbet is larger but only slightly so than the outside diameter $d_o$ of the sleeve 16. Accordingly, as can be seen in FIGS. 2 and 3, the top circular edge 36a and portions of the cylindrical side wall 30 of the sleeve may be received in the rabbet. This cylindrical side wall 46 confines the sleeve against spreading at the axial split discontinuity 32 as will be described further below.

In the assembled configuration, the upper edge 36a of the sleeve and portions of the cylindrical side wall of the sleeve are received in the annular rabbet 42 of the washer 14. The axial distance between the detents 38 adjacent this upper cylindrical edge 36a and the upper surface 48 of the washer opposite that 50 in which the rabbet is formed, is less than the axial distance between the load bearing surface 20 of the fastener and the annular rib 46. However, the latter axial distance is sufficiently small relative to the former to prevent the sleeve and washer from becoming disassembled. That is, the one edge of the washer is prevented from becoming disengaged from the rabbet. This dimensional relationship and that between the diametrical dimension of the constriction defined by the detents 38 and of the diameter of the washer hole and the diameters $d_u$ and $d_r$ respectively of the unthreaded shank portion 24 and of the rib 26 of the fastener permit both the washer and sleeve to rotate freely on the fastener. Further, the axial distance between at least portions of the surface 50 of the washer and the lower circular edge 36b of the sleeve when in the assembled condition shown is equal to or only slightly less than the thickness of the workpiece W. As can also be seen in FIGS. 2 and 3, the unthreaded portion of the shank has smaller axial extent than the axial dimensions of the sleeve. Therefore, threads of the thread portion of the shank extend upwardly into the sleeve.

Accordingly, when the fastener 12 is tightened into a threaded hole in the support S, the major part of the clamping load is borne by the cylindrical column formed by the sleeve 16 and portions of the washer overlying the sleeve which are compressed between the load bearing surface 20 of the fastener and the upper surface of the support. The sleeve is confined against spreading by the side wall 46 of the rabbet 42 when bearing axial clamping loads. Further, the washer tightly confines the workpiece against the upper surface of the support without applying a major portion of the clamping load through the washer onto the workpiece.

The unique design and assembly of the components of the present invention enchance the economy with which it may be made as well as the reliability with which it may be assembled. More particularly, formation of the sleeve and washer as separate components requires substantially less material than that which would be required if these two components were formed as a unitary structure by, for example, stamping or drawing. Further, the sleeve may be rolled and heat treated to be hardened prior to assembly. In the preferred method of assembly, the sleeve is positioned loosely in a nest which orients the cylindrical side wall in a known attitude. The washer is then assembled onto the sleeve with an end thereof positioned in the rabbet in the washer. A second nest associated with the first nest in an assembling apparatus may be provided for this purpose. The shank of the threaded fastener is then dropped through the washer hole and the sleeve and driven onto the sleeve so that it separates slightly at the split discontinuity. The diametrical dimension of the constriction defined by the detents 38 are thereby enlarged beyond the normal diametrical dimension so that the detents may be passed over the annular rib to a position lying between the rib and the load bearing surface of the fastener. In this operation, the sleeve is spread at the axial split discontinuity. However, because of prior heat treatment the limits of plastic deformation of the sleeve should not be exceeded and the sleeve should, therefore, return to its normal condition with the cylindrical side wall collapsed at the axial split discontinuity. The detents will then reliably be returned to their normal condition in which the constriction that they define has a normal diametrical dimension less than the diameter of the annular rib. Once assembled as described above, the three components of the present invention are not easily disassembled.

Alternatively, the sleeve can be roll formed directly onto the shank of the fastener with the detents 38 positioned between the rib and load bearing surface of the fastener. The sleeve can be heat treated after such assembly. Again, once the components are assembled in this fashion, they typically are not easily or accidently disassembled.

In both methods of assembly, the normal heat set condition of the sleeve is achieved with the sleeve assembled with the fastener and with normal diametrical dimension of the constriction of the sleeve less than the diameter of the rib.

It is also known that a column having a discontinuity or split in its side wall tends to support axial loads more poorly than a column having a homogenious or continuous side wall because a split column can spread at the split and collapse. However, in the present invention, interfittment of the sleeve with the annular rabbet in the washer tends to prevent spreading of the sleeve at the axial discontinuity under axial load. Because of the reliable return of the sleeve to its normal condition after assembly by either method described above, tolerances between the detents and rib need not be as precise as those between a drawn constriction in a homogenious rib and a similar rib. Further, since in one method the axial split discontinuity may be spread sufficiently to expand the sleeve for assembly well within the elastic limits of plastic deformation of the sleeve as mentioned above, damage due to stress or strain of the sleeve is minimized.

As noted, the principle features of the present invention may be adapted to screws or other forms of fastener devices. Moreover, washers of other configurations than those illustrated can also be used without departing from the teachings of the invention. For example, the washer need not have a conical configuration but may be flat or may have an inverted conical configuration to accommodate a flat head screw that lies generally flush with the top surface of the workpiece. It is, however, important that the axial distance between the portion of the surface of the washer that bears the clamping load on the workpiece and the extreme edge of the sleeve be equal to or slightly less than the thickness of the workpiece.

It has also been found that when the support is relatively thin, for example, when the support is sheet metal, certain dimensional relationships are important to maximizing the torque to which the fastener may be tightened before the support is stripped. More particularly, it is most advantageous that the inner surface of the cylindrical side wall of the sleeve lie as closely adjacent the crests of threads of the fastener as possible. This relationship prevents the support from being drawn up into the space between the thread crest and the inner surface of the cylindrical side wall of the sleeve. A second embodiment for practicing this knowledge is shown in FIGS. 5 and 6. Here, the support S is shown as being a relatively thin piece of sheet metal. In this embodiment, the fastener 12 and washer 14 are identical to those shown with reference to the first embodiment. However, the sleeve rather than being punched or staked with detents, is continuously formed with two grooves 60 adjacent opposed circular edges 136a and 136b thereof. The inside diameter of each groove 60 is greater than the outside diameter of the rib. However, the inside diameter of the cylindrical side wall of the sleeve, particularly those regions 62 between the groove 60 and the extreme edges 136, is less than the outside diameter of the rib and only slightly greater than the outside diameter of the thread crests of the threaded portion of the fastener shank. Further, the regions 62 form ridges that project radially inwardly of the troughs of grooves 60 and thereby form constrictions having diameters less than the diameter of the rib 26. An inwardly facing cylindrical land 64 is defined between the grooves 60. This structure provides a bearing surface on the sleeve constituted by the bottom edge 136b of the sleeve having substantially uniform thickness which encircles the thread crest of the fastener. Since this bearing surface of the sleeve lies closely adjacent the thread crest, the support is not drawn up into the region between the thread crests and the inner surface of the side wall of the sleeve.

Tests of this design feature were conducted as follows: A washer-like spacer having a 0.25 inch inside diameter was mounted on a ¼-20 threaded fastener having machine type threads. This fastener was tapped into a sheet metal support structure having thickness 0.036 inch. Since the nominal crest diameter of threads of this dimension is 0.250, the difference between the inside diameter of the spacer and the crest diameter of the sleeve was nominally zero, though it is in fact finite because the spacer freely rotated on the fastener. When tightened down, the support material stripped at a torque of 60 inch-pounds.

This test was conducted with an identical fastener and support material but with a spacer device having inside diameter of 0.312 inch. In this instance, the support structure stripped at a torque of 50 inch-pounds.

Similar tests were conducted with a ¼-14 threaded fastener having spaced rather than machine threads. Similar spacer dimensions were also used. In the test conducted with the spacer having the same nominal inside diameter as the nominal crest diameter of the threaded fastener, the support structure was stipped at a torque of 57 inch pounds. In the test conducted with a spacer device having the larger inside diameter, the support structure was stripped at a torque of 55 inch pounds.

It must be noted that neither of these tests were performed with the sleeve and washer assembly of the present invention but were only conducted with washer-like spacers having the nominal inside diameters mentioned. However, it is submitted that these tests show that the design of the present invention will maximize the torque that can be applied to the fastener before the support structure is stripped.

Accordingly, although specific embodiments of the present invention have been described above in detail, it is to be understood that this is for purposes of illustration. Modifications may be made to these structures in order to adapt them to particular applications.

What is claimed is:

1. An improved fastener assembly for securing a workpiece to a support, the workpiece having known thickness, a hole therethrough and being subject to plastic deformation; said assembly comprising:

a threaded fastener including a head having a load bearing surface; and a shank projecting from said head generally perpendicularly from said surface and having an unthreaded portion adjacent said head, a radially outwardly protruding annular rib spaced from said surface, and a threaded portion projecting coaxially from said unthreaded portion beyond said rib, said rib having a larger diameter than either the diameter of the crests on the threads of said threaded portion or the diameter of said unthreaded portion;

a sleeve including a generally cylindrical side wall having a split discontinuity therein and circular edges at opposing axial extremes thereof; said sleeve, with said side wall normally collapsed at said discontinuity, defining a normal inside diameter larger than the diameter of said rib and a normal outside diameter smaller than the diameter of the hole in said workpiece; said sleeve further including means forming a radially inwardly projecting constriction adjacent at least one of said edges, confined between said rib and said bearing surface, having a normal diametrical dimension, with said side wall normally collapsed at said discontinuity, less than the diameter of said rib; and washer means having a hole therein with a diameter greater than the diameter of said rib and less than said normal outside diameter of said sleeve; said washer means being received about said unthreaded portion of said shank and formed on one face thereof with an annular rabbet about said washer hole having a base and a radially inwardly facing cylindrical side wall with a diameter greater than said normal outside diameter of said sleeve, said one edge being received in said rabbet to assemble said sleeve and said washer means together and confine said side wall of said sleeve against spreading, the axial distance between at least a portion of said one face of said washer means and the edge of said sleeve opposite said one edge, when said washer means and sleeve are assembled, being slightly less than the thickness of said workpiece, and the axial distance between the face of said washer means opposite said one face and said contriction forming means when said washer means and sleeve are assembled being less than the axial distance between said load bearing surface and said rib.

2. The fastener assembly of claim 1, wherein said axial distance between said load bearing surface and said rib is sufficiently small relative to said axial distance between said opposite face of said washer means and said constriction forming means to prevent disassembly of said washer means and said sleeve yet permit free rotation of said washer means and said sleeve relative to said fastener.

3. The fastener assembly of claims 1 or 2 wherein said constriction forming means comprises at least two radially inwardly projecting detents formed adjacent said one edge of said sleeve.

4. The fastener assembly of claims 1 or 2 wherein said constriction forming means comprises radially inwardly projecting annular ridge formed adjacent said one edge of said sleeve.

5. The fastener assembly of claim 4 said sleeve further being formed with a radially outwardly projecting annular groove on said side wall thereof axially inwardly of said ridge.

6. The fastener assembly of claim 5, said sleeve further being formed with an inwardly facing cylindrical land axially adjacent said annular groove, said land defining said normal inside diameter of said sleeve.

7. The fastener assembly of claim 1, wherein constriction forming means are formed adjacent both said edges of said side wall of said sleeve.

8. The fastener assembly of claim 1, wherein said sleeve is made from a material which permits said diametrical dimension of said ccnstriction forming means to be enlarged without plastic deformation of said sleeve from said normal dimension to be greater than the diameter of said rib to position said constriction forming means between said load bearing surface and said rib by spreading said side wall of said sleeve at said discontinuity.

9. The fastener assembly of claim 1, wherein said opposite edge of said sleeve lies closely adjacent the crests of said threads of said threaded portion of said shank to minimize draw of said support between said sleeve and said threaded portion.

10. An improved fastener assembly comprising:

a fastener including a head having a load bearing surface; and a shank projecting from said head generally perpendicularly from said surface and having an upper portion adjacent said head, a radially outwardly protruding annular rib spaced from said head, and an operative portion for securing said assembly to a support projecting coaxially from said upper portion beyond said rib, said rib having a larger diameter than either the diameter of said upper portion or said operative portion;

a sleeve including a generally cylindrical side wall having a split discontinuity therein, circular edges at opposing axial extremes thereof and, with said side wall normally collapsed at said discontinuity, defining a normal inside diameter larger than the diameter of said rib; said sleeve further including means forming a radially inwardly projecting constriction adjacent at least one of said edges, confined between said rib and said bearing surface, having a normal diametrical dimension, with said side wall collapsed at said discontinuity, less than the diameter of said rib; and washer means having a hole therein with a diameter greater than the diameter of said rib and less than said normal outside diameter of said sleeve; said washer means being received about said upper portion of said shank, and formed on one face thereof with an annular rabbet about said hole having a base and a radially inwardly facing cylindrical side wall with a diameter greater than said normal outside diameter of said sleeve, one edge of said sleeve being received in said rabbet to assemble said washer means and said sleeve and to confine said side wall of said sleeve against spreading.

11. The fastener assembly of claim 10, wherein the axial distance between said load bearing surface and said rib is sufficiently small relative to the axial distance between the face of said washer means opposite said one face and said constriction forming means to prevent disassembly of said washer means and said sleeve yet permit free rotation of said washer means and said sleeve relative to said fastener.

12. The fastener assembly of claims 10 or 11, wherein said constriction forming means comprises at least two radially inwardly projecting detents formed adjacent said one edge of said sleeve.

13. The fastener assembly of claims 10 or 11, wherein said constriction forming means comprises radially inwardly projecting annular ridge formed adjacent said one edge of said sleeve.

14. The fastener assembly of claim 13, said sleeve further being formed with a radially outwardly projecting annular groove on said side wall thereof axially inwardly of said ridge.

15. The fastener assembly of claim 14, said sleeve further being formed with an inwardly facing cylindrical land axially adjacent said annular groove, said land defining said normal inside diameter of said sleeve.

16. The fastener assembly of claim 10, wherein constriction forming means are formed adjacent both said edges of said side wall of said sleeve.

17. The fastener assembly of claim 10, wherein said sleeve is made of a material which permits said diametrical dimension of said constriction forming means to be enlarged without plastic deformation of said sleeve from said normal dimension to be greater than the diameter of said rib to position said constriction forming means between said load bearing surface and said rib by spreading said side wall of said sleeve at said discontinuity.

18. A washer and sleeve assembly for use with a fastener to secure a workpiece to a support, the workpiece having known thickness, a hole therethrough and being subject to plastic deformation, said fastener including a head having a load bearing surface and a shank projecting from said head generally perpendicularly from said surface and having an upper portion adjacent said head, a radially outwardly protruding annular rib spaced from said surface, and an operative portion projecting coaxially from said upper portion beyond said rib, said rib having a larger outside diameter than either the outside diameter of said upper or operative portions; said washer and sleeve assembly comprising:

a sleeve including a generally cylindrical side wall having a split discontinuity therein and circular edges at opposing axial extremes thereof; said sleeve, with said side wall normally collapsed at said discontinuity, defining a normal inside diameter larger than the diameter of said rib and a normal outside diameter smaller than the diameter of the hole in said workpiece; said sleeve further including means forming a radially inwardly projecting constriction adjacent at least one of said edges having a normal diametrical dimension, with said side wall normally collapsed at said discontinuity, less than the diameter of said rib; and washer means having a hole therein with a diameter greater than the diameter of said rib and less than said normal outside diameter of said sleeve; said washer means being receivable about said unthreaded portion of said shank and formed on one face thereof with an annular rabbet about said washer hole having a base and a radially inwardly facing cylindrical side wall with a diameter greater than said normal outside diameter of said sleeve, said one edge being receivable in said rabbet to assemble said sleeve and said washer means together and confine said side wall of said sleeve against spreading, the axial distance between at least a portion of said one face of said washer means and the edge of said sleeve opposite said one edge, when said washer means and sleeve are assembled, being slightly less than the thickness of said workpiece, and the axial distance between the face of said washer means opposite said one face and said constriction forming means when said washer means and sleeve are assembled being less than the axial distance between said load bearing surface and said rib.

19. The assembly of claim 18, wherein said constriction forming means comprises at least two radially inwardly projecting detents formed adjacent said one edge of said sleeve.

20. The assembly of claim 18, wherein said constriction forming means comprises radially inwardly projecting annular ridge formed adjacent said one edge of said sleeve.

21. The assembly of claim 20, said sleeve further being formed with radially outwardly projecting annular groove on said side wall thereof axially inwardly of said ridge.

22. The assembly of claim 21, said sleeve further being formed with an inwardly facing cylindrical land axially adjacent said annular groove, said land defining said normal inside diameter of said sleeve.

23. The assembly of claim 21, wherein constriction forming means are formed adjacent both edges of said side wall of said sleeve.

24. A method of assembling an improved fastener device that comprises a fastener including a head having a load bearing surface; and a shank projecting from said head generally perpendicularly from said surface and having an upper portion adjacent said head, a radially outwardly protruding annular rib spaced from said head, and an operative portion for securing said assembly to a support projecting coaxially from said upper portion beyond said rib, said rib having a larger diameter than either the diameter of said operative portion or said upper portion; a sleeve including a generally cylindrical side wall having a split discontinuity, circular edges at opposing axial extremes thereof and, with said side wall normally collapsed at said discontinuity, defining a normal inside diameter larger than the diameter of said rib, said sleeve further including means forming a radially inwardly projecting constriction adjacent at least one of said edges having a normal diametrical dimension, with said side wall collapsed at said discontinuity, less than the diameter of said rib; and washer means having a hole therein with a diameter greater than the diameter of said rib and less than said normal outside diameter of said sleeve, said washer means being receivable about said upper portion of said shank and formed on one face thereof with an annular rabbet about said hole having a base and a radially inwardly facing cylindrical side wall with a diameter greater than said normal outside diameter of said sleeve, said one edge being receivable in said rabbet to confine said side wall of said sleeve against spreading, the axial distance between the face of said washer means opposite said one face and said constriction forming means, when said washer means and said sleeve are assembled, being less than the axial distance between said load bearing surface and said rib; said method comprising the steps of:

mounting said washer means on said fastener by placing said shank through said hole in said washer means with said opposite surface of said washer means confronting and adjacent said bearing surface; and mounting said sleeve in its normal configuration on said fastener and assembling it with said one edge received in said rabbet of said washer means and with said constriction forming means located between said rib and said load bearing surface.

25. The method of claim 24 further comprising:

roll-forming said sleeve from flat material prior to said second mounting step, said normal diametrical dimension of said constriction forming means being enlargeable with the limits of plastic deformation of said material to be greater than said diameter of said rib, and wherein said second mounting step comprises:

spreading said sleeve at said discontinuity, without plastically deforming said sleeve, to enlarge said diametrical dimension sufficiently to pass said constriction forming means over said rib and locate it between said rib and said load bearing surface and thereafter permitting said sleeve to return to its normal configuration.

26. The method as claimed in claim 24, wherein said second mounting step comprises:

roll-forming said sleeve from flat material in place about said shank with said constriction forming means located between said rib and said load bearing surface.

27. The method as claimed in claim 25 or 26 further comprising:

heat treating said sleeve before said second mounting step.

28. The method as claimed in claim 25 or 26 further comprising:

heat treating said sleeve after said second mounting step.

* * * * *